United States Patent [19]

Germanton et al.

[11] Patent Number: 4,536,851

[45] Date of Patent: Aug. 20, 1985

[54] ELECTRONIC THERMOMETER AND ASSOCIATED APPARATUS

[76] Inventors: Damon Germanton, 7 Alberta Dr., Kinnelon, N.J. 07405; Charles Germanton, 38 Mountain Ave., Summit, N.J. 07901; Donald Weiss, 200 Cliffside Park, Winston Towers, Englewood, N.J. 07631

[21] Appl. No.: 436,022

[22] Filed: Oct. 22, 1982

[51] Int. Cl.$^3$ .......................... G01K 1/08; G01K 7/20
[52] U.S. Cl. ................................... 364/557; 374/102; 374/108; 374/170; 374/183
[58] Field of Search ................ 364/557; 374/102, 108, 374/170, 183, 101, 185, 172

[56] References Cited

U.S. PATENT DOCUMENTS

| | | | |
|---|---|---|---|
| 3,793,630 | 2/1974 | Meijer | 364/557 X |
| 3,978,325 | 8/1976 | Goldstein et al. | 364/557 X |
| 4,031,365 | 6/1977 | Raggiotti et al. | 364/557 |
| 4,068,526 | 1/1978 | Goldstein | 364/557 X |
| 4,110,746 | 8/1978 | Furukawa et al. | 374/170 X |
| 4,150,573 | 4/1979 | Ininuma et al. | 374/170 X |
| 4,158,965 | 6/1979 | Prosky | 374/170 X |
| 4,159,648 | 7/1979 | Prosky | 374/170 |
| 4,161,880 | 7/1979 | Prosky | 364/557 X |
| 4,176,556 | 12/1979 | Takenaka | 364/557 X |
| 4,210,024 | 7/1980 | Ishiwatari et al. | 374/171 X |
| 4,447,884 | 5/1984 | Wada | 364/557 |
| 4,464,067 | 8/1984 | Hanaoka | 364/557 X |

Primary Examiner—Edward J. Wise
Attorney, Agent, or Firm—Arthur L. Plevy

[57] ABSTRACT

An electronic thermometer is particularly adapted for use as a fever thermometer and employs a unique temperature sensor configuration comprising a platinum temperature sensing resistor and tantalum nitride reference resistor both mounted on the same substrate. The resistors are selectively coupled to the input of a dual ramp integrator forming part of an analog to digital converter. Digital control circuitry causes the sensing resistor to be coupled to the input of the integrator during a first mode and causes the reference resistor to be coupled to the input during a second mode. Included in the digital circuitry is a first sensor memory and a second reference memory. These memories have stored therein a digital number indicative of the response of both resistors at a predetermined temperature obtained during initial calibration of the sensor and thermometer. The stored values are compared during the respective mode with the accumulated count in a clock counting circuit. If a match occurs the electronics advance the sequence to enable any excess count occurring during the second mode to be monitored and eventually displayed as manifesting the measured temperature. The digital electronics controls the measurement process in a sequential manner to assure accuracy and stability of the final reading. The circuitry enables a display of the last measured temperature prior to making a new measurement, and further includes circuitry for monitoring the level of a lithium battery source which is permanently sealed within the unit and to permanently disable the unit when the source is no longer capable of providing sufficient voltage to secure accuracy.

While a fever thermometer for home or hospital use is disclosed, the techniques are applicable for other types of temperature measurements; such as laboratory equipment, monitoring, laboratory and industrial controllers, indoor or outdoor thermometers for the home or office.

20 Claims, 7 Drawing Figures

ELECTRONIC THERMOMETER AND ASSOCIATED APPARATUS

BACKGROUND OF THE INVENTION

This invention relates to electronic thermometers and more particularly to an integral self-contained thermometer capable of measuring the body temperature of an individual.

The prior art is replete with a number of patents relating to electronic temperature indicators and more particularly to conversion of a temperature. In regard to such prior art techniques, there is a persistent problem in selecting and implementing an optimum sensor device which will accurately respond to the temperature of the human body with a minimum accuracy of ±0.2 of 1° F. The prior art utilized many devices which are temperature sensitive, but which have substantial problems in implementing the above described accuracy.

Thermistors which are temperature sensitive devices are extremely nonlinear and in order to operate the same in conjunction with a thermometer, one requires extensive compensating circuitry and elaborate calibration techniques. Devices such as thermocouples have extremely small outputs and create problems in compensating for the cold junction. There are, of course, integrated circuit devices such as temperature transducers which may incorporate diodes or temperature sensitive resistors fabricated from semiconductor materials. These devices, apart from being expensive, require multipoint calibration and are not particularly suitable for measuring temperature within the above described accuracy.

It is, of course, understood that utilizing electronic techniques to measure temperature is, in fact, well known in the art and as indicated, many references disclose pertinent techniques. In any event, there is a need for an electronic thermometer which essentially would replace the conventional mercury thermometer which is now employed relatively extensively throughout the world. In order to provide such a device, one must employ an extremely accurate and reliable sensor which is capable of operating over long periods of time, such as for many years, without recalibration while being extremely rugged and convenient and simple to use. In accordance with such a desire, the electronic thermometer should be relatively small, reliable, while possessing an accurate digital readout of body temperature. The use of the thermometer should be identical to the use of a conventional thermometer as providing temperature measurement by inserting the same into the appropriate cavity of a user. In order to accommodate the long use and rugged requirements, one needs to provide an instrument which will dissipate small amounts of energy to enable the same to operate on a self-contained battery for an extensive period of time. Hence, the circuitry which converts the output of the sensor into a final digital display must be capable of being integrated, must be rugged and accurate in format and structure to accommodate all the above described requirements.

As indicated, the prior art has attempted to specify devices which are electronic and operate to measure temperature. U.S. Pat. No. 3,834,238 entitled ELECTRONIC THERMOMETER issued on Sept. 10, 1974 to F. K. Mueller et al discloses an electronic thermometer having a temperature sensitive probe. The probe is essentially a thermistor which operates in conjunction with suitable compensating circuitry. In the patent, the thermistor operates in conjunction with two optional electronic circuits; each of which include means for changing a basic comparison voltage in increments through a series of reference voltage levels. The output of the circuit monitors the voltage output from the thermistor until the thermistor voltage and a comparison voltage are equal corresponding to the measured temperature.

U.S. Pat. No. 3,906,796 entitled ELECTRONIC TEMPERATURE MEASURING APPARATUS issued on Sept. 23, 1975 to R. F. Dumbeck depicts apparatus where temperature is measured by sensing the voltage across two series resistors. One resistor is a reference resistor and the other a temperature variable resistor fabricated from platinum. The resistors are associated with two matched current sources; each of which passes current in opposite directions towards the junction of the resistors to provide a null at a predetermined temperature. The patent describes linearization techniques which serve to match the temperature characteristic of the variable sensor with a linear voltage scale as, for example, the scale of a digital voltmeter. In this manner, one can read temperature directly via the voltmeter in either degrees centrigrade or Fahrenheit. Tracking is also accomplished over a wide temperature range by increasing the current output from the current sources by a feedback technique.

U.S. Pat. No. 3,946,613 entitled ELECTRONIC THERMOMETER AND PROBE issued on Mar. 30, 1976 to S. Silver. This Patent employs a thermistor probe which is coupled to a bridge circuit and permanently calibrated to the bridge circuit. A similar technique is depicted in U.S. Pat. No. 3,949,609 issued on Apr. 13, 1976. Other Patents which attempt to measure temperature utilize algorithms in order to predict a final temperature output. Such a technique is described in U.S. Pat. No. 3,978,325 issued on Aug. 31, 1976 to H. Goldstein, et. al.

As indicated, many electronic thermometers have been designed for hospital use and are relatively bulky and cumbersome devices. These units cannot be conveniently utilized for home use as they are extremely complicated and expensive. Example of such devices are depicted in U.S. Pat. No. 4,007,832 and U.S. Pat. No. 4,008,614.

With the advent of digital circuitry and in particular the integrated circuit, there has been an attempt in the prior art to utilize digital techniques including a digital display of temperature to indicate the final reading. While many of such techniques are interesting they suffer in that they cannot accurately respond to temperature variation within the tolerances required for typical use. Indicative of such prior art is U.S. Pat. No. 4,009,615 entitled SELF-CONTAINED ELECTRONIC DIGITAL THERMOMETER issued on Mar. 1, 1977 to G. A. Ruhl, U.S. Pat. No. 4,030,363 entitled ELECTRONIC THERMOMETER issued on June 21, 1977 to M. E. Halleck, U.S. Pat. No. 4,068,526 entitled ELECTRONIC THERMOMETER issued on Jan. 17, 1978 to H. Goldstein.

Essentially, devices which employ digital techniques utilize an analog to digital convertor to convert the output of the sensor to a digital signal which is finally displayed. It is of course understood that the techniques in regard to such units vary. For examples of such techniques reference is made to U.S. Pat. No. 4,092,863 entitled ELECTRONIC THERMOMETER CIRCUIT issued on June 6, 1978 to R. Turner, U.S. Pat. No. 4,121,462 entitled TEMPERATURE INDICATING APPARATUS issued on Oct. 24, 1978 to R. Mohrman, U.S. Pat. No. 4,158,965 entitled ELECTRONIC THERMOMETER WITH HEAT CONDITION PROBE issued on June 26, 1979 to H. Prosky, and U.S. Pat. No. 4,161,880 entitled LINEARIZED DIGITAL THERMOMETER issued on July 24, 1979 to H. Prosky.

It is absolutely obvious that there exists a great number of Patents which attempt to monitor temperature and to provide the user with either a digital or analog display. These thermometers employ electronic techniques and hence may be generically referred to as electronic thermometers. In any event the problems of the prior art in providing such a thermometer are significant and as one can ascertain such devices have not been successful due to many factors. As alluded to above, a major problem is a formation of a sensor which is capable of accurately responding to temperature variations with a satisfactory time constant. Another significant problem relates to calibration of the device. For example, if such devices are to be operated by means of a battery or other source of power, one must be sure that voltage variations do not affect the calibration. As one understands, electronic circuitry is sensitive to changes in voltage, temperature, humidity and other environmental factors and many of the prior art devices do not maintain accurate temperature measurement under such varying factors. A further factor to be considered is the type of sensor employed, as most prior art devices employ and use thermistor devices which are nonlinear and have extreme problems in proper calibration.

As indicated above, other typical types of sensor devices which may include thermocouples, integrated circuit transducers as well as, semi-conductor diodes suffer in regard to signal output, calibration and accuracy.

In conjunction with sensor problems, the circuit techniques employed in many of the above indicated patents have problems in regard to the accuracy of readout, power consumption, reliability, which make such techniques particularly difficult to implement for use in a conventional thermometer.

It is therefore an object of the present invention to provide an improved thermometer incorporating a unique sensor configuration to enable the reading of temperature in an extremely accurate manner. A further object is to provide an electronic thermometer assembly which is extremely compact as employing an electronic thermometer assembly which is extremely rugged and which assembly utilizes small amounts of power to enable extended operation in a typical home or hospital environment.

BRIEF DESCRIPTION OF THE PREFERRED EMBODIMENT

An electronic thermometer apparatus for performing temperature measurements over a given range, comprising a first sensing resistor exhibiting a linear resistance variation over said range, a second reference resistor exhibiting a relatively constant resistance characteristic over said range, with said first and second resistors arranged in a series path, a switching circuit coupled to said first and second resistors in said series path and operative when activated to select said first resistor in a first mode and said second resistor in a second mode, an analog to digital converter coupled to said resistors via said switching circuit and responsive to provide a first output during said first mode and a second output during said second mode, first storage means for storing therein at least one value indicative of the characteristic of said second resistor at a given temperature, logic means responsive to said first resistor achieving a resistance value over said temperature range to thereby cause said switching means to select said second resistor and to compare the value of said second resistor with said stored value commencing when said first resistor achieves said value to respond to any excess over said stored value, and means for converting said excess to the actual temperature within said range.

DETAILED DESCRIPTION OF FIGURES

Figure 1:
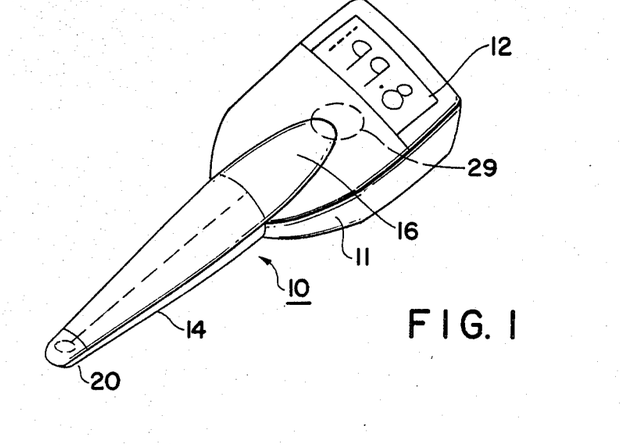
FIG. 1 is a perspective plan view of a thermometer device according to this invention.

Referring to FIG. 1, there is shown an electronic thermometer module 10. Essentially, the thermometer 10 is a self-contained integral unit. The housing depicted is by way of example and many different housing configurations are envisioned both for rectal or oral temperature measurements. Essentially, the housing comprises a probe section 14 and a cover section 11. Located in the probe section 14 is an electronic assembly in the form of an integrated circuit. The circuit is responsive to the output of a temperature sensor 20 and converts this output to a number portrayed on a digital display 12 associated with the thermometer 10. The longitudinal tubular section 14, a stem-like or rod-like structure, constitutes the portion of the thermometer to be inserted into the appropriate cavity of the user. Shown in dashed configuration in FIG. 1 is the temperature sensing module 20 located in housing section 14.

The temperature sensor supplies ratiometric resistance change which is proportional to body temperature. This ratiometric resistance, when excited by a constant current, supplies a ratiometric voltage change. This voltage is then converted by an analog to digital converter which is included in the electronic assembly. The conversion affords a digital signal which is capable of being displayed as 4 significant digits mainifesting the body temperature of the user. Thus the temperature display will indicate body temperature in tenths of a degree such as 100.6° F. Also associated with the thermometer 10 is a switch 16 which, as will be explained, is actuated in order to operate the thermometer. The thermometer 10 is an integral unit which is included in a unitary housing. The housing containing the electronic assembly as well as the sensor is extremely rugged and waterproof. The unit contains a lithium battery 29, which is the sole power source for the electronics. The battery is miniature in size, such as the type employed in watches, and may have a diameter of about 23 millimeters with a thickness of approximately 2.5 millimeters. Such batteries are available with nominal voltages of 3 volts and having a service capacity of approximately 160 mah (milliampere hours). In this manner, the life expectancy of the thermometer due to the low power dissipation of both the liquid crystal display and electronics is approximately 10 years. The digital display 12 as indicated constitutes a liquid crystal module which includes at least four numerical character digits and a decimal point. Such displays are widely available. A typical display employed with this thermometer has an operating voltage of 2 volts with a maximum drive current of 0.4 microamps. The typical response time for such a display is approximately 250 milliseconds. The dimensions of the display are approximately 0.8" in length and 0.5" in width. Accordingly the entire thermometer 10 is a long life unit which is capable of operating in excess of 10 years.

Before proceeding with a detailed explanation of the assembly a brief description of the general specifications of the electronic thermometer 10 will be given.

In order to accurately respond to the body temperature of a human the thermometer has an accepted measurement range between 96.0° F. to 106.0° F. with an accuracy of ±0.2° F. and a resolution of 0.1° F. The unit employs a liquid crystal display which display requires low amounts of power. The power source such as the lithium battery is non-replaceable and permanently sealed into the unit at the time of manufacture. The effective life time of the unit is 10 years. The response time in regard to a temperature measurement is typically less than 1 minute. The unit may also possess a low battery indication whereby the term LO will be displayed on the display approximately 6 months before the device becomes inoperable. Once the battery voltage is no longer sufficient to provide a reliable temperature indication the display will permanently remain blank thus disabling the thermometer when the unit can no longer operate to reliably indicate body temperature. At this time the unit will be discarded and the user may purchase another unit. It is of course apparent that the digital display of temperature offers great versatiltiy and convenience to the consumer. Hence almost any individual can reliably operate this thermometer which is not the case for a conventional thermometer employing mercury or other indicating means.

In order to gain a clearer insight of the operation of the device and a fuller understanding of the requirement for the electronics, a brief description of the pertinent characteristics will be given. The unit depicted in FIG. 1 is operated as follows: The switch 16 may be momentarily depressed twice. This momentary depression of switch 16 activates the electronic circuitry and causes the display 12 to indicate the last temperature taken. This temperature will be indicated for a predetermined interval of time, which in the preferred embodiment is 3 seconds. The switch 16 may be redepressed immediately to take new temperature with initial flashing minus sign on the display 12 to indicate that this is being done. The thermometer may be returned to storage or may be placed in the appropriate body cavity. When a temperature of 96.0° F. is reached the flashing minus sign is cleared from the display and the instantaneous temperature is then displayed as it rises above 96.0° F. in a flashing mode. As soon as the rate of change of temperature has decreased sufficiently, the temperature display is locked and the final temperature is displayed in a constant ON mode for a predetermined interval which may for example be 2 minutes. The entire display automatically clears and the circuit is deactivated after this time period. It is of course understood that the above noted time intervals are by way of example only and such intervals can be modified or altered as will be explained. The switch 16 can be momentarily depressed or activated twice in succession at any time subsequent to the last temperature taken in order to briefly recall that measurement. This of course enables the user to monitor a patient's temperature by always knowing what the last reading was. Deactivation of the thermometer eliminates all power consumption and hence enables the long product life by minimizing battery use.

Thus as described, the electronic thermometer is an extremely useful product. The thermometer can be utilized for both oral and rectal measurements. Essentially as indicated above many suitable configurations or alternate configurations will be envisioned from the structure depicted in FIG. 1.

Figure 2:
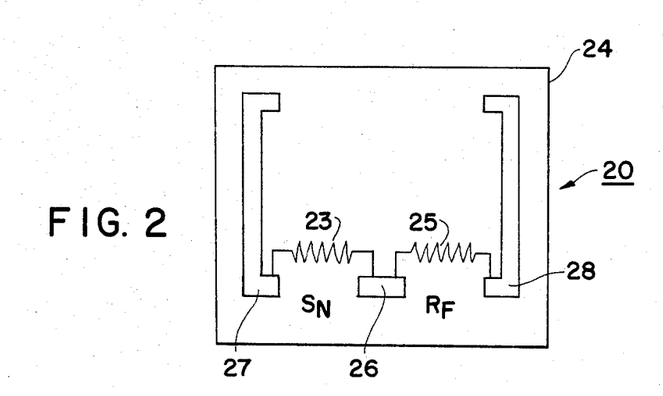
FIG. 2 is a top plan view of a temperature sensor configuration according to this invention.

Referring to FIG. 2 there is shown a sensor configuration 20 which is employed with the thermometer of this invention. As will be explained, the sensor 20 includes a platinum sensor (SN) resistor 23 which is deposited on a planar substrate 24. The substrate 24 also contains a reference resistor 25 fabricated from tantalum-nitride (RF). The substrate 24 is fabricated from monocrystalline silicon. The substrate is prepared with an extremely thin layer of thermally grown silicon dioxide. The layer of dioxide is approximately 10,000 Angstrom units (Å). The length of the chip is 0.075", the width is 0.05" with a thickness of approximately 0.008".

As seen from FIG. 2 the sensor resistor 23 and the reference resistor 25 has a common termination evidenced by a bonding pad 26. Each resistor has an additional terminal connected to bonding pads 27 and 28. Each bonding pad is deposited on the substrate by a conventional metallization process and constitutes pure gold with a thickness of 15 KÅ. The terminal pads 27 and 28 are employed to permit connection of the resistor configuration to a current source terminal and a voltage sense terminal. These connections are necessary to operate this sensor in conjunction with the associated electronics to be explained.

The sensor resistor 23 is fabricated from relatively pure platinum (99.9% pure). The reference resistor 25 is fabricated from tantalum-nitride. The resistance temperature coefficient (TCR) of the sensing resistor 23 is a minimum of +2800 PPM/° C. The TCR of the sensing resistor is −100±100 PPM° C. In order to fabricate both resistors as 23 and 25 one employs a sputtering technique and the metal is deposited on the substrate 24 as a thin film. Since both resistors are formed by similar techniques and are located on the same substrate, there will be various drift factors which will tend to cancel. The resistors are selected in magnitude so that the ratio of the sensor resistor to the reference resistor is preferably 0.6 at a temperature of 96.0° F. This ratio may vary between 0.3 to 1 at this temperature from unit to unit. The ratio of these resistors at any temperature within the range of 96.0° F. to 106.0° F. will not vary by greater than ±0.01% for the maximum life of the unit at ambient temperature.

The ratio of the resistors is extremely important as the circuitry to be described does not depend upon the absolute magnitude of either resistor but depends upon the relative ratio of the sensor resistor to the reference resistor. In this manner, once the ratio is maintained, the sensor resistor will exhibit a linear change in resistance with temperature and hence the ratio of the resistors over the temperature range is linear. One immediately notes that the resistor configuration avoids the necessity of ever trimming or calibrating the temperature sensor. In prior art devices, a Wheatstone bridge or half array was employed and in order to calibrate such bridges or other resistor arrays, one had to tailor each resistor in order to obtain an accurate value. This calibration had to be done over the entire temperature range hence the prior art would use laser trimming to customize each resistor or would add extremely stable and accurate resistors to assure accuracy. As one can see, these techniques are extremely time consuming and relatively complicated, thus substantially increasing the cost of temperature sensing configurations. The sensor shown is extremely reliable and more details can be had by reference to a copending application entitled TEMPERATURE SENSING APPARATUS filed on Oct. 22, 1984 Ser. No. 436,611 by D. Germanton, an inventor herein.

The reference resistor 25 is fabricated from tantalum nitride which is a rugged and reliable thin film resistor material. This resistor 25 provides extremely reliable performance in high humidity atmospheres. In fabrication of resistor 25 on a silicon substrate 24, a protective self-passivating layer of tantalum pentoxide is grown on a tantalum nitride film during stabilization. This is the same material which is employed as a dielectric in high reliability electrotytic capacitors with sulphuric acid as the electrolyte. This layer of tantalum pentoxide conforms to the resistance pattern and leaves no residue on the bonding pads. Tantalum pentoxide has excellent protective properties against humidity, abrasion, chemical attack and further oxidation.

The platinum resistor 23 is deposited on the oxidized silicon substrate 24 by a thin film technique. The film is annealed and stabilized at a temperature in excess of 500° C. The platinum film resistor is very inert and hence the resistor is extremely stable. The platinum resistor 23 exhibits a linear change in resistance with temperature over limited ranges. As will be explained, the ratio of resistances is important and as long as this ratio is maintained over the desired temperature operating range, the thermometer unit employing the sensor 24 will operate reliably.

Figure 3:
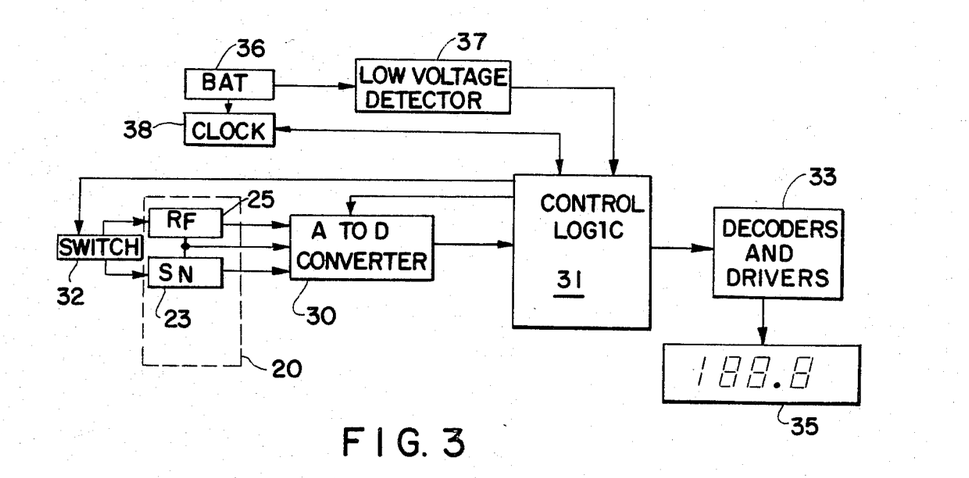
FIG. 3 is a simple block diagram depicting the electronics employed in this invention.

Referring to FIG. 3, there is shown a simplified block diagram of an electronic thermometer according to this invention. Shown in FIG. 3 is the reference resistor RF and the temperature sensor resistor SN. The resistors indicated are those resistors shown as 23 and 25 of FIG. 2, which are located on the substrate 24. Each resistor has one output coupled to a respective input of an analog to digital convertor 30 (A/D). The function of the A/D convertor 30 is to convert an electrical signal at the output. The output of the A/D convertor 30 is coupled to an input of a control logic module 31. As will be explained, the module 31 includes digital logic circuitry which controls the sequence of events which occur during a temperature measurement. The module 31 has one output coupled to the A/D convertor 30 and one output which controls the operation of a switch 32. As will be explained, the switch 32 functions to couple the temperature sensor 23 to the A/D convertor 30 during the first mode and to couple the reference resistor 25 to the A/D convertor during the second mode.

As indicated above, the switch 32 is under control of the module 31. Module 31 also serves to direct the digital signal to appropriate digital decoders as 33 to provide the proper signals for activating the tenths and units digits of the liquid crystal display 35. All of the electronic circuitry is powered by a battery 36 which is a lithium battery and which battery is sealed into the unit as explained. A low voltage detector 37 monitors the battery voltage as compared to a reference voltage and will alter the display when the battery voltage is no longer sufficient to reliably operate the electronics. Also shown is a clock circuit 38, which functions to supply timing signals to the electric circuitry incoporated in the thermometer.

Figure 4:
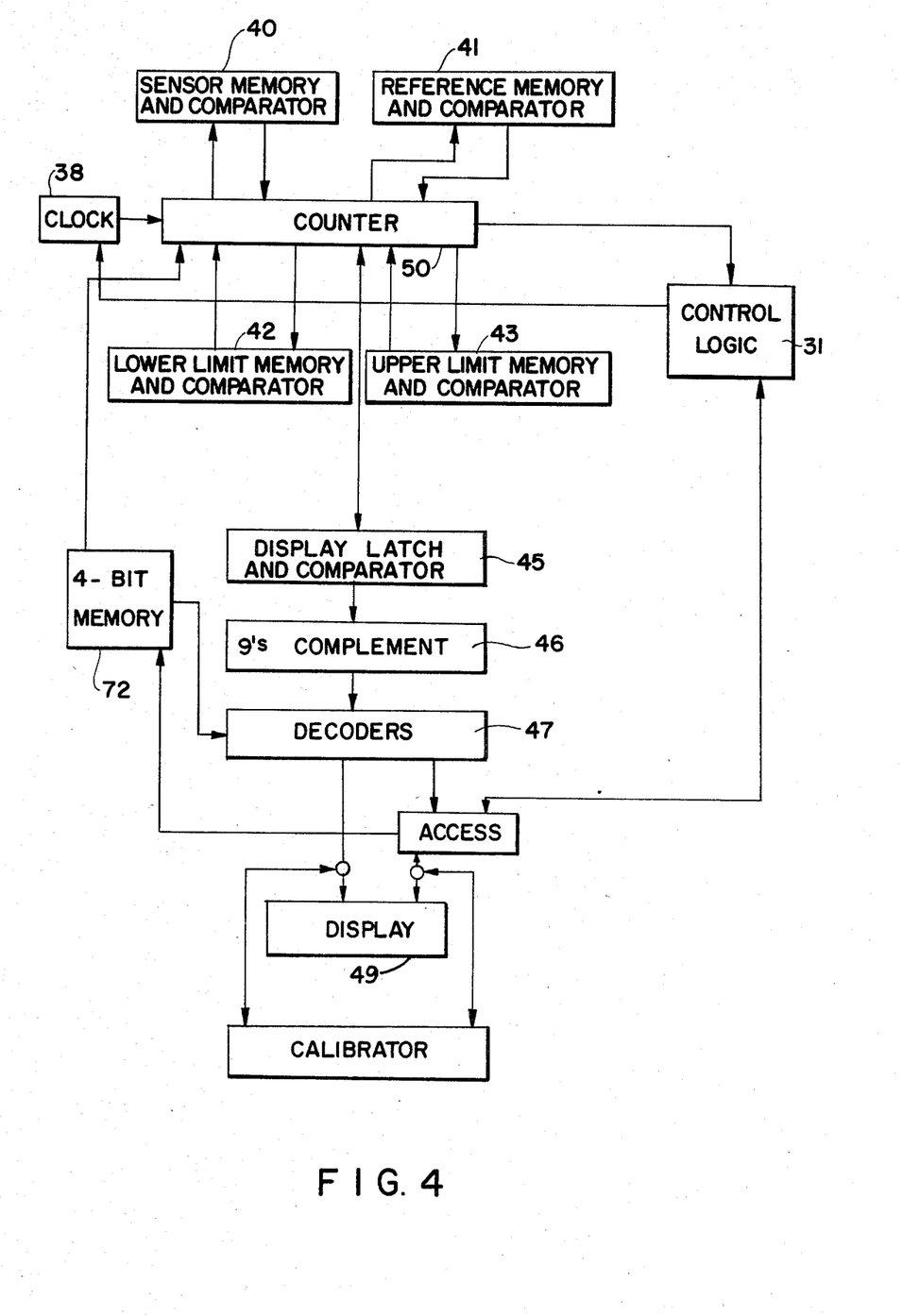
FIG. 4 is a simple block diagram of a memory and counter format employed in this invention.

Referring to FIG. 4, there is shown a block diagram of this system. A bit counter 50 is continuously activated by the clock. Associated with the counter 50 are sensor memory/comparator 40 and reference memory/comparator 41. These memories and comparators are distributed bit-by-bit each in close association with the corresponding counter stage. In similar fashion lower limit memory/comparator 42 and upper limit memory/comparator 43 may be included in the circuitry. The display latch and comparator 45 are distributed among the counter stages 50. Numeral 40 references a first memory for storing a plurality of bits indicative of a value obtained from the sensor resistor during calibration. A second memory 41 is capable of storing a number of bits indicative of a value obtained from the reference resistor during calibration. A further memory 72 is depicted. Memory 72 is a 4 bit memory which is programmed to digitally adjust the clock frequency. In regard to a particular format each memory such as 40 and 41 has stored therein 17 bits indicative of a reading obtained during calibration of the thermometer. Each of the five comparator signals controls logic 31 when all counter bits are each in agreement with the associated memory bit. Shown in FIG. 4 is the display latch 45 which holds the most recently processed temperature reading in memory. The control circuit 31 is depicted in FIG. 4 and as will be explained, is used to provide a sequential operation of the thermometer to enable all measurements to take place before the final temperature is displayed.

Figure 5:
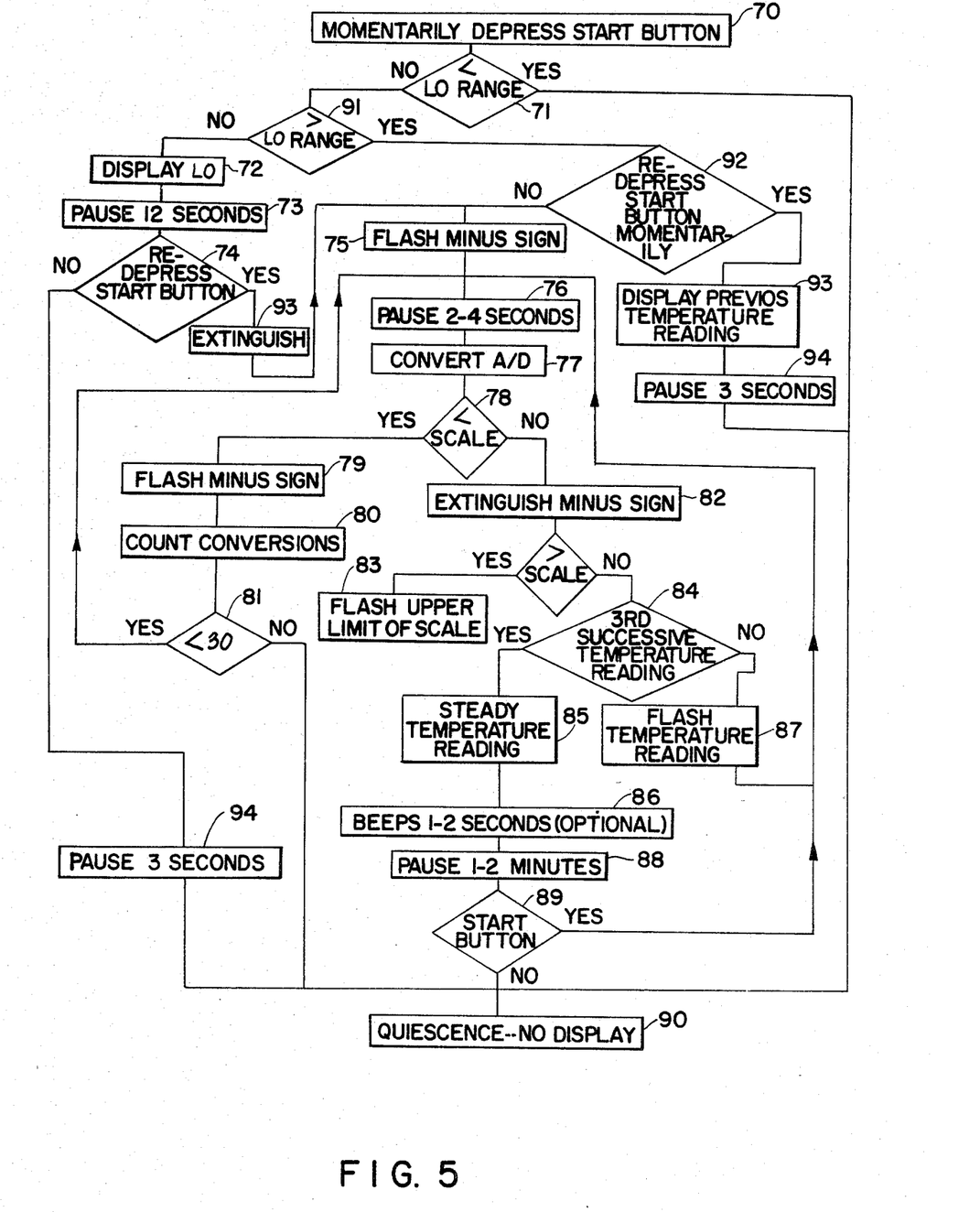
FIG. 5 is a flow chart depicting the sequence and operation of the electronic thermometer.

Before proceeding with a detailed description of the electronic circuitry it is believed that a description showing a flow chart of operation is warranted. In this manner as will be apparent, the electronic thermometer can be implemented in operation by utilizing a microprocessor type device which can be programmed to accomplish the objectives of the flow chart as well as by conventional digital and analog circuitry. In essence as depicted in FIG. 3, the processor 31, the switch 32, the decoders and latch 33, 34, and 36 are all digital circuits and can therefore be implemented in operation by a microprocessor.

Referring to FIG. 5, the first operation to be performed by a user is to depress the start button. The start button is for example, button or switch 16 of FIG. 1. In the flow chart description each step as evidenced by the modules will be designated by a reference numeral in parenthesis as shown in the Figure.

The step of actuating the start button (70) causes a voltage comparator to compare the battery voltage with a reference voltage (71). This is the operation for example, simply shown in FIG. 3 as comparator 37. If the battery is unusable the display will not come on and the unit is to be discarded. If the battery level is satisfactory, and the user as indicated, depresses the button, the display will then indicate a flashing minus sign (75). Thus the display may include a minus sign or other indication that a temperature measurement is to be made. After the flash and followed by a suitable pause (76), and A/D conversion of temperature (77) will take place. If the temperature being measured is below scale (78), as it is below 96° F., the minus sign continues to flash (79) and the measurement is continued (80) by a new cycle being implemented. The thermometer is caused to repeat the measuring sequence for a number of times (81) which for example, may be 30 times as shown in module 81. If the temperature being measured does not reach 96° F., the display will be extinguished as shown in the flow chart. However, when measuring body temperature, which is normally 98.6° F., this will not occur and the temperature sensed will rise within scale or rise above the limit of 96° F. When this occurs, the minus sign is extinguished (82). At this point, the display begins to flash the temperature being measured which is in excess of 96° F. (84, 87). In order to assure temperature stabilization and to provide a correct reading, the cycle or measurement is repeated a given number of times (84). After three consecutive identical readings which are in range and are taken at timed intervals such as 3 seconds, it is assumed that the temperature is stable and a steady temperature is displayed in a steady mode (85). This can be further indicated by activating an audible signal for a predetermined period to indicate to the user that the final temperature is displayed (86). However, the final temperature is displayed in a steady mode (85). If a steady temperature is not reached or detected (87), the measurements continue and the changing temperature is displayed in a flashing mode. Once the steady temperature is detected a pause of 1 to 2 minutes is provided (88) to display this value. If the start button is not depressed during this display, the display and the thermometer is inactivated (90) at the end of the pause. If however, the user depresses the start button again (89), a new reading and new 1 to 2 minute pause are implemented.

Also shown on the flow chart is a module 92. If the start button is depressed twice in succession, the thermometer will display the previous temperature reading as stored (93). This temperature is displayed for a period of 3 seconds (94) and then the display is turned off. The user can now depress the start button again to commence operation and temperature measurement as described above. Thus, as can be seen from the above flow chart the logic sequence described can be implemented in many ways including the use of a microprocessor which can be programed to facilitate such operation.

Figure 6:
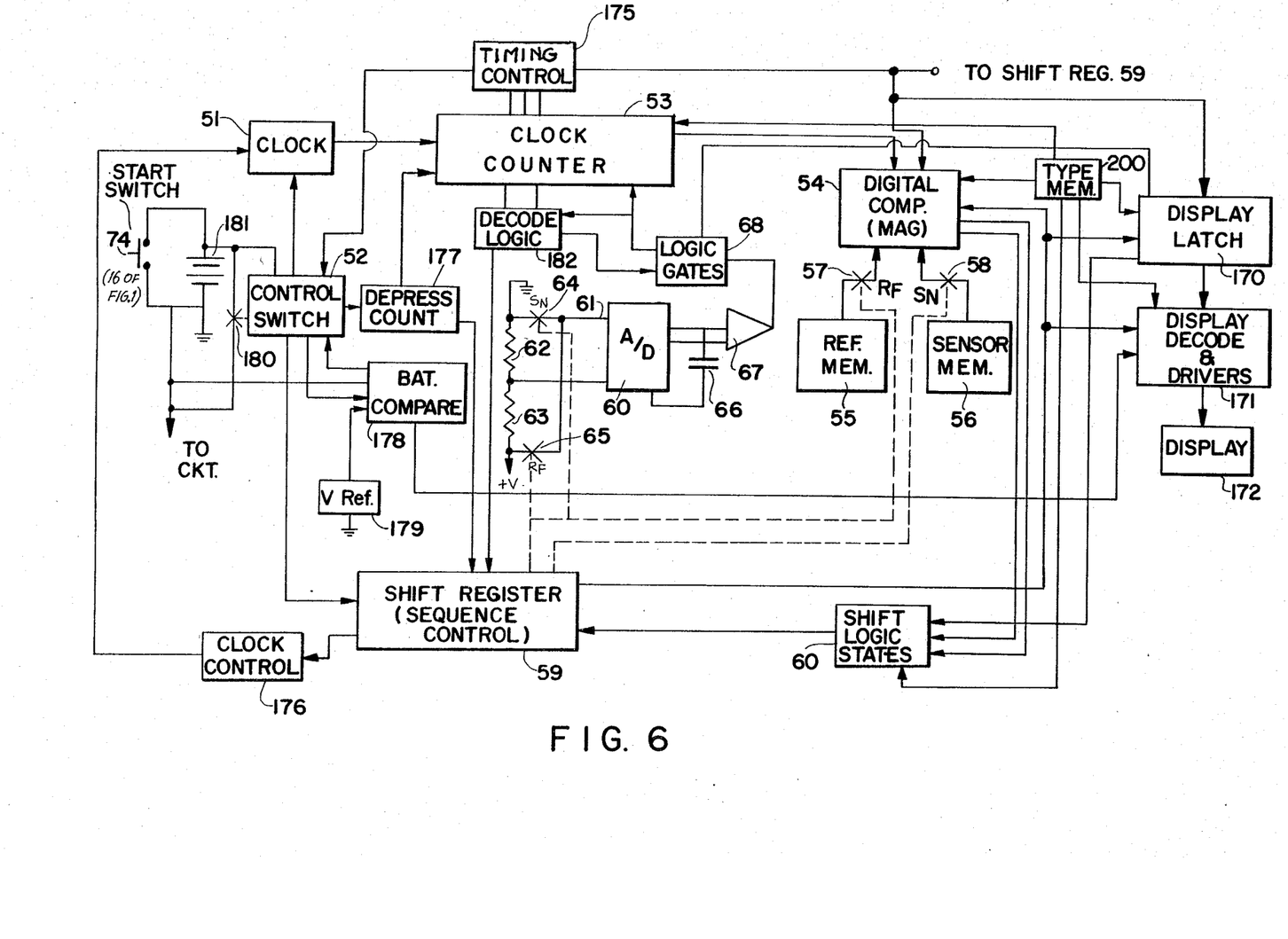
FIG. 6 is a detailed block diagram of the digital and analog circuitry of the thermometer.

Referring to FIG. 6, there is shown a block diagram of an electronic thermometer according to this invention. The structure depicted in FIG. 6 is portrayed in greater detail than the relatively simple embodiment depicted in FIG. 3.

As indicated above, the thermometer of this invention is capable of operating for many years on the single self-contained lithium battery 181 and hence, when the voltage of the battery reaches a low level, the entire unit may be discarded.

The low voltage detector 37, as shown in FIG. 3, is a conventional integrated circuit and many types and configurations of such comparators are well known in the art. In FIG. 6 the battery 181 is coupled to the start switch 74 (16 of FIG. 1). When the switch is depressed the switch control circuit 52 activates contact 180 connecting the battery 181 in circuit and thus supplies power to the thermometer. The battery voltage is compared with a suitable reference (179) to determine if it is within operating limits. This is done by the battery comparator circuit 178. If the voltage is correct, operation commences as described in connection with FIG. 5.

There is shown a clock circuit 51. The clock circuit 51 is a conventional astable multivibrator or other simple pulse generator. There are many examples of clock circuits which will provide a predetermined series of pulses at a given repetition rate at the output which are used to provide timing signals to digital circuits. The clock circuit, as will be explained, can have the repetition frequency or pulse rate varied by means of a control circuit 176 coupled thereto.

It is indicated at the onset that based on the technique to be described, that the clock circuit does not have to be crystal controlled as variations in the clock circuit are automatically compensated for by circuit operation. The output of the clock 51 is directed to the input of a clock counter module 53. There are numerous examples of suitable counting circuits which will operate for counter 53, as well as, the fact, that many counting configurations are available in integrated circuit form. The counter 53 may for example consist of 22 stages and hence is capable of providing a corresponding number of counts namely, $2^{21}$. The output of the clock counter 53 is directed to one input of a digital comparator 54 which operates to compare the magnitude of the count in counter 53 with the data as stored in either the reference memory 55 or the sensor memory 56. Both memories are coupled to another input of the comparator 54 by means of the selectively activated swtiches 57 and 58. Switches 57 and 58 may be simple transistors or FET devices and hence, will provide a high impedance in an open state (X) and a low impedance or short circuit in the closed state. The comparator 54 may consist of a plurality of exclusive OR gates. Essentially, digital comparators as 54 are well known and operate to compare a given number of binary bits at one input with the same number of bits at the other input. In this example, 17 bits indicative of a calibration value for the reference resistor 63 and 17 bits for the sensor resistor 62 are stored in memories 55 and 56. The comparator 54 compares 17 bits with 17 counter bits from counter 53, as will be explained.

The sequence of operation of the electronics in the thermometer is controlled by means of a shift register 59. The shift register 59 again is a conventional circuit which will provide a change of state each time a transition is applied to an input. The shift register 59 can be advanced by means of suitable logic gates 60 under control of the comparator 54, as well as, other control signals which will be described.

Shown in block form is the A/D converter 60 having an input 61 coupled to the sensor resistor 62 and the reference resistor 63. As shown in the schematic, either resistor can be coupled to the input 61 of the A/D converter 60 by means of switches 64 and 65, also designated as SN and RF. These switches are controlled by the shift register 59 together with switches 57 and 58. Essentially, the output of the A/D converter is represented by a storage capacitor 66. A more complete circuit diagram of the A/D converter 60 will be given. The output across capacitor 66 is applied to the input of an analog comparator circuit 67. The circuit 67 controls a series of logic gates 68 which in turn control the clock circuit 53 and various other modules, as will be explained.

The display latch 170 is a memory device capable of storing data from the counter 53 for application to the display decoder and driver module 171 which has its output coupled to the LCD display 172.

For purposes of explanation, it is assumed, as will be explained, that the reference memory 55 and the sensor memory 56 have stored therein digital numbers indicative of a reading taken during calibration of the thermometer device. The number stored in the reference memory 55 is a 17 digital number which number is obtained as indicated during factory calibration of the thermometer. For example, when the thermometer is assembled in the factory, the tubular stem 14 containing the temperature sensor 20 (FIG. 1) is inserted into a highly stable bath, the temperature of the bath is maintained at a constant temperature of, for example, 96° F. During calibration, the temperature of 96° F. causes the sensor resistor 62 to provide a first voltage at the output of comparator 67 which voltage manifests a given number of pulses as counted by the counter 53. This count is stored in the sensor memory 56 and hence is an accurate determination of the value of voltage that resistor 62 will provide with this thermometer at the bath temperature. In a similar manner, the voltage provided by resistor 63 or the reference resistor is again converted to count pulses and this digital number is stored in the reference memory 55 and is indicative of the voltage that the reference resistor 63 provides at the reference temperature of 96° F. With these factors in mind, the operation of the circuit will be explained.

The display latch 170 is also a memory and has stored therein the last temperature indicated by the thermometer circuitry.

The operation of the device is as follows:

When the thermometer is removed from storage and is to be used, the stem 14 of FIG. 1 is inserted, for example, into the mouth of the user. In this state, there is no power being supplied by the battery and hence, the display 172 is blank and the clock 51 is inhibited. As soon as the switch 74 is depressed, the battery is coupled to the circuit 53 and in turn enables the display latch memory 170 to display a minus or other indication in a flashing mode. It is of course understood that the technique for flashing a display is well-known. If the user desires to access the last temperature taken, the switch 74 is again depressed. This double depression is detected by the depress count circuit 177 which in turn activates the display latch 170. The display latch has the last temperature read stored therein and causes this to be displayed. During this mode the counter 53 is activated and the timing control 175 decodes a pause of 3 seconds whereby the display is removed. Upon receipt of this signal the shift register 59 is placed into its quiescent state and the user may then depress switch 74 again to place the circuitry in the temperature measuring mode. After implementing the flashing display, the control circuit 52 advances to the temperature sensor indicating position. At this time, the clock frequency 51 is increased and hence, the pulse rate into the clock counter 53 is increased. Thus shift register 59 activates the clock control 176 to change the repetition rate of the clock 51 to a higher rate.

During the temperature sensing mode which is the next event to occur, the clock is now set at a higher frequency and the shift register when advanced, causes switches 64 and 58 to close. Hence, the temperature sensing resistor 62 is now connected to the A/D converter 60. The A/D converter 60 provides an increasing voltage across capacitor 66. When the sensor count is reached sequence control circuit advances to the reference counting state. At this time, switches 64 and 58 are open and switches 65 and 57 are closed. Hence, at this time the reference sensor 63 is now connected to the A/D converter 60 and the reference memory 55 is connected to the comparator 54. The A/D converter 60 is now in the reference mode and a negative voltage is provided at the input of the A/D converter. The counter 53 proceeds to count the clock pulses during the reference mode and under control of comparator 67. The magnitude comparator 54 again looks for a match between the output of counter 53 and the bits stored in the reference memory 55. During this time the voltage across capacitor 66 is decreasing at a rate proportional to the voltage drop across resistor 63. For present purposes assume that the temperature being monitored is greater than 96° F. As soon as comparator 54 indicates a match between the bits stored in the reference memory 55 with the output of the counter, this indicates that the temperature of 96° F. has been reached. The shift register 59 is now advanced to the next state. At this time, the counter is reset and enables the BCD counter to count the excess bits or the time to fully discharge capacitor 66, and the instantaneous temperature of the sensor is displayed as it rises above 96° F. which temperature is shown in a flashing mode. Thus, each count from the counter 53 after 96° F. has been reached causes a display of the excess count. For example, two counts of counter 53 may correspond to a temperature increase of 0.1° F. In this mode the display decoder 171 converts excess counts into degrees F. The comparator 54 is deactivated once the match is obtained in the reference mode. Thus, as the temperature increase above 96° F., the display indicates a new temperature in a flashing mode. During this mode the clock rate is changed to a lower rate to provide time for further rise in temperature. The timing control 175 continues to monitor the time and operation and allows a reasonable period to assure that the temperature reading stabilizes. After this period the temperature display remains at the last update and will indicate the final temperature in a non-flashing mode. This temperature is stored in the display latch 170 and is displayed for an additional period of two minutes. After this period the display is cleared and the circuit is deactivated, eliminating all power consumption from the battery during storage.

As one can ascertain from the flow chart of FIG. 5, the analog to digital conversion process thus described is repeated until consecutive temperature readings are indicated. This factor causes the final display of temperature and causes this value to be stored in the display latch 170. In order to do this the output of the clock counter 53 is monitored by the decode logic 182 which monitors suitable stages until the A/D conversion has been completed. The excess count is known with respect to temperature as the characteristics of each temperature sensor is known. Hence this period is reset at the end of this period to start the temperature detecting sequence over. When the count is stabilized as in the least significant digit, this assumes that the maximum temperature is achieved as the decode logic will recognize no change for consecutive successive readings. Thus the final temperature is then read as the decode logic stops the count at this value. This value is then stored in the display latch 170 and is then displayed for the requisite period under control of the timing control 175. After this period the unit is reset, the battery 181 is disconnected via the control switch 52. The battery is required to maintain a continuous potential on the controlling gates of the transistors for all the memories. Since the memories are CMOS devices only leakage current is consumed during storage.

Also depicted in FIG. 6 is a type memory 200, which is shown in FIG. 4 as memory 42. The above described thermometer is especially useful for a fever thermometer to be sold and utilized as a consumer product and to replace the conventional mercury thermometer found in most homes and hospitals. The principles of operation as described above are applicable to any measurement system and hence the thermometer can provide a digital display and perform measurements in any system. The system is determined entirely by the numbers stored in the sensor memory 56 and the reference memory 55. By scaling these memories together, the thermometer can be calibrated in any system. For example, the thermometer for use in the United States is calibrated and displays temperature in degrees Fahrenheit. For use in Europe or elsewhere one may desire a display in degrees centigrade.

The nine's complement circuit can be employed to handle temperature ranges which depict negative degress as in the case where the thermometer is used as an indoor, outdoor or laboratory unit. It is of course understood that the principles described above are applicable to temperature measurement in all environments, but are particularly adaptable to the measurement of body temperature.

Figure 7:
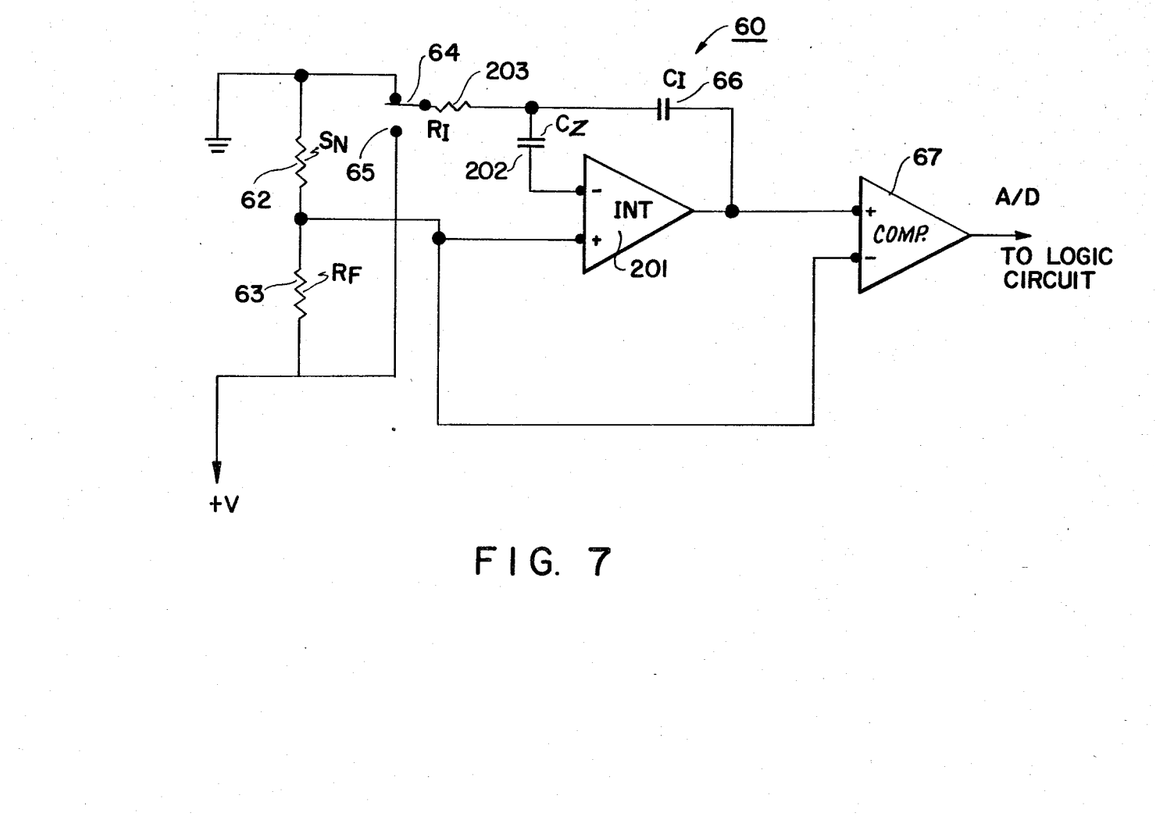
FIG. 7 is a simplified diagram of a dual ramp integrator employed in this invention.

Referring to FIG. 7, there is shown a schematic of the A/D convertor 60 of FIG. 6. The circuit depicted employs a high gain operational amplifier 201 arranged as an integrator, having a storage capacitor CI, (66 of FIG. 6), coupled between input and output via capacitor 202 (CZ). The integrator is a dual ramp integrator and provides a positive slope ramp during the temperature sensor mode (SN) and a negative slope ramp during the reference mode (RF). The appropriate resistors as 62 and 63 are switched in by the shift register sequence as described. The resistor 203 is employed as a gain control for the circuit. The integrator is automatically adjusted for zero offset prior to implementation of a temperature measurement by storage of this offset across capacitor 202 (CZ).

The CI capacitor 66 in FIG. 7 is fundamental to the proper functioning of the system. As mentioned previously, the resistance of SN resistor varies with the temperature being sensed whereas the resistance of RF resistor is relatively unaffected by the temperature. The sensor memory 56 provides a fixed amount of time during which the voltage across resistor 62 acting through resistor 203 charges capacitor 66. Integrator 201 acts to stabilize or maintain the current through resistor 203. The reference memory 55 provides a second fixed amount of time during which the voltage across resistor 63 acting through resistor 203 discharges capacitor 66. If the sensed temperature is equal to the lower limit, capacitor 66 would now be completely discharged. If, however, the sensed temperature exceeds the stored lower limit, the high voltage drop across resistor 62 charges capacitor at a higher rate. The voltage drop across resistor 63, now being lower, results in a decreased discharge rate thereby leaving a residual charge on capacitor 66 at the end of the reference count at which time the BCD counters are enabled. After complete discharge of capacitor 66, the output signal from comparator 67 drops abruptly thereby disenabling BCD counters, updating display latch 170 and displaying the new temperature value in display 172.

Since the reference resistor is fixed and the voltage ratio VS/VR is proportional to RS/RR, and since the clock runs at a constant rate during a measurement, it can be shown that the circuit will provide a maximum error of about 0.04° F. over a temperature measurement range between 96° F. to 106° F. Accordingly, the ratio of the two resistors 62 and 63 is the meaningful number and hence the voltages can be substituted for this ratio. Since the ratio of resistances is the prime factor, then there is provided an automatic cancellation of power supply variations, thus eliminating the need for a precision voltage regulator. However, a regulator is used to compensate for variations during the course of each cycle, where the absolute value of regulated voltage is not critical.

Thus, there has been described an extremely rugged and reliable electronic thermometer which employs a unique sensor configuration incorporating a relatively pureplatinum resistor mounted on the same substrate with the tantalum-nitride resistor.

The measurement technique depends on the ratio between these resistors to allow accurate measurements with 0.1° F. accuracy without recalibration over extended periods of time. The unit includes two memories for storing calibrated values indicative of the response of the reference and sensor resistors at a predetermined temperature. All measurements use these values as reference values to determine a new temperature. The entire unit is hermetically sealed and contains a lithium battery which is permanently employed therein. A dual slop integrator operates in conjunction with digital logic circuitry to perform a number of sequential operations necessary to respond to measured temperature. The entire unit is extremely rugged and compact and can function as a fever thermometer to enable an unskilled consumer to measure temperature as desired.

We claim:

1. An electronic thermometer apparatus for performing temperature measurements over a given range, comprising:
    (a) a first sensing resistor exhibiting a relatively linear resistance variation over said range, a second reference resistor exhibiting a relatively constant resistance characteristic over said range, with said first and second resistors arranged in a series path,
    (b) a switching circuit coupled to said first and second resistors in said series path and operative when activated to select said first resistor in a first mode and said second resistor in a second mode,
    (c) an analog to digital converter coupled to said resistors via said switching circuit and responsive to provide a first output during said first mode and a second output during said second mode,
    (d) first storage means for storing therein at least one value indicative of the characteristic of said second resistor at a given temperature,
    (e) logic means responsive to said first resistor achieving a resistance value over said temperature range to thereby cause said switching means to select said second resistor and to compare the value of said second resistor with said stored value commencing when said first resistor achieves said value to respond to any excess over said stored value, and (f) means for converting said excess to the actual temperature within said range.

2. The thermometer apparatus according to claim 1 wherein said second resistor is fabricated from tantalum-nitride and said first resistor is fabricated from platinum.

3. The thermometer apparatus accordig to claim 1 wherein said analog to digital converter includes a dual ramp integrator with an input terminal connected to said switching means.

4. The thermometer apparatus according to claim 3.

5. The thermometer apparatus according to claim 4 further including a digital comparator having one input coupled to the output of said clock counter and a second input selectively coupled to said first and second storage means and means for selecting said first storage means during said first mode and said second storage means during said second mode.

6. The thermometer apparatus according to claim 1 wherein said integrator provides a positive sloped ramp signal during said first mode and negative sloped ramp signal during said second mode.

7. The thermometer apparatus according to claim 1 further including second storage means for storing therein a second value indicative of the resistance of said first resistor at said given temperature and means for comparing said stored value with said resistance value within said temperature range to enable said switching means in said second mode. Wherein said logic means includes a clock circuit operating at a given frequency, a clock counter coupled to said clock circuit and responsive to the output of said ramp integrator to provide a number of pulses indicative of the resistance variations of said first resistor in said first mode.

8. The thermometer apparatus according to claim 7 further including a shift register responsive to said comparison between said stored value and said first resistor value to actuate said switching means in said second mode.

9. The thermometer apparatus according to claim 1 further including display means coupled to said means for converting said excess for providing a visual temperature display of the same.

10. The thermometer apparatus according to claim 1 wherein said given range is between 96° F. to 106° F.

11. An electronic thermometer apparatus for performing temperature measurements over a given temperature range comprising:
(a) first and second resistors in series, with said first resistor exhibiting a linear resistance variation over said range, and with said second resistor exhibiting a relatively constant resistance characteristic over said range,
(b) a dual ramp integrator having an input terminal and an output terminal,
(c) first actuatable switching means coupling said input terminal of said integrator to said series path, whereby in a first mode said first resistor is coupled to said input and in a second mode said second resistor is coupled to said input,
(d) a source of clock pulses,
(e) a counter having a count input coupled to said source of clock pulses, and an output,
(f) first and second memories, with said first memory having stored therein a first value indicative of the resistance of said first resistor at a given fixed temperature within said range, with said second memory having stored therein a second value indicative of the resistance of said second resistor at said fixed temperature,
(g) a digital comparator having a first input coupled to the output of said counter, and a second input, said comparator having an output for providing a control signal when the data at said first input corresponds to the data at said second input,
(h) second actuatable switching means coupling said first and second memories to said second input of said comparator,
(i) logic means operative to switch said first and second switching means in a first mode to cause said first resistor being coupled to said integrator and said first memory being coupled to said comparator, said logic means including means responsive to said first value as stored being equal to said counter state to switch said first and second switching means to said second mode indicative of said second resistor being coupled to said integrator and said second memory being coupled to said comparator, and
(j) means coupled to said counter and responsive to said control signal from said comparator during said second mode to monitor any count in excess of said second stored value, which count is indicative of temperature within said range differenct from said fixed temperature.

12. The electronic thermometer apparatus according to claim 11 further including a start switch coupled to said clock source and counter and operative upon depression of the same to activate said clock source and to reset said counter at the beginning of a temperature measurement.

13. The electronic thermometer according to claim 12 further including additional storage means coupled to said counter and operative to store the value of the last temperature measured.

14. The electronic thermometer according to claim 13 further including a battery source for biasing said thermometer apparatus and means for monitoring said source to provide an output when said battery voltage is not sufficient to provide an accurate measurement.

15. The electronic thermometer according to claim 14 wherein said battery source is a lithium battery.

16. The electronic thermometer according to claim 13 further including:
means for monitoring the battery voltage for disabling the thermometer if the battery is no longer capable of providing a sufficient voltage value.

17. The electronic thermometer according to claim 11 further including:
display means coupled to said means coupled to said counter for displaying said excess count indicative of temperature to enable a visual indication of the same.

18. The electronic thermometer according to claim 11 wherein said first resistor is fabricated from a relatively pure platinum and said second resistor is fabricated from tantalum-nitride.

19. The electronic thermometer according to claim 11 wherein said logic means includes a shift register for providing a number of unique output states upon application to an input of an activating signal, with said input coupled to said digital comparator, and with one output state controlling said first and second actuable switching during said first mode and another output controlling the same during said second mode.

20. The electronic thermometer according to claim 11 further including:
control means coupled to said clock for providing at an output a first series of clock pulses at a first repetition rate and a second series of clock pulses at a second higher repetition rate, with an input of said control means coupled to said logic means for providing said higher rate during said first and second modes.

* * * * *